United States Patent
Gafni et al.

(10) Patent No.: US 12,132,656 B2
(45) Date of Patent: Oct. 29, 2024

(54) STATEFUL FILTERING SYSTEMS AND METHODS

(71) Applicant: MELLANOX TECHNOLOGIES TLV LTD., Raanana (IL)

(72) Inventors: Barak Gafni, Campbell, CA (US); Aviv Kfir, Nili (IL); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 26 days.

(21) Appl. No.: 16/945,886

(22) Filed: Aug. 2, 2020

(65) Prior Publication Data

US 2022/0038372 A1  Feb. 3, 2022

(51) Int. Cl.
*H04L 45/74* (2022.01)
*H04L 45/00* (2022.01)
*H04L 45/42* (2022.01)

(52) U.S. Cl.
CPC .............. *H04L 45/74* (2013.01); *H04L 45/34* (2013.01); *H04L 45/38* (2013.01); *H04L 45/42* (2013.01)

(58) Field of Classification Search
CPC ......... H04L 45/42; H04L 45/38; H04L 45/34; H04L 45/74; H04L 69/22; H04L 29/06027; H04L 45/16; H04L 43/028; H04L 43/08
USPC ....................................................... 709/238
See application file for complete search history.

(56) References Cited

U.S. PATENT DOCUMENTS

| | | | | |
|---|---|---|---|---|
| 7,933,268 B1* | 4/2011 | Melman | ............... | H04L 12/4641 370/389 |
| 2004/0139313 A1* | 7/2004 | Buer | ....................... | H04L 69/22 713/150 |
| 2008/0037427 A1* | 2/2008 | Kist | .................... | H04L 41/0896 370/235 |
| 2008/0320585 A1* | 12/2008 | Ansari | ................ | H04L 63/1416 726/13 |
| 2011/0134791 A1 | 6/2011 | So | | |
| 2011/0255540 A1* | 10/2011 | Mizrahi | .................. | H04L 45/74 370/392 |
| 2014/0036679 A1 | 2/2014 | Cherian et al. | | |

(Continued)

FOREIGN PATENT DOCUMENTS

| WO | 0165343 A1 | 9/2001 | | |
|---|---|---|---|---|
| WO | WO-2005101754 A1 * | 10/2005 | .......... | H04L 45/245 |

(Continued)

OTHER PUBLICATIONS

Sliding-Mode Predictive Control of Networked Control Systems Under a Multiple-Packet Transmission Policy Hongbo Li;Hongjiu Yang;Fuchun Sun;Yuanqing Xia IEEE Transactions on Industrial Electronics (Year: 2014).*

(Continued)

*Primary Examiner* — June Sison
(74) *Attorney, Agent, or Firm* — MEITAR PATENTS LTD.

(57) ABSTRACT

A method for filtering packets, the method including receiving a plurality of packets, each packet of the plurality of packets including a source address, and for each one packet of the plurality of packets, processing the one packet by performing the following: modifying the source address of the one packet to include at least an identifier of a flow to which the one packet belongs. Related apparatus and methods are also provided.

24 Claims, 4 Drawing Sheets

(56) References Cited

U.S. PATENT DOCUMENTS

| | | | | |
|---|---|---|---|---|
| 2015/0117455 | A1* | 4/2015 | Umesh | H04L 45/742 370/392 |
| 2015/0172112 | A1* | 6/2015 | Itkin | H04L 45/245 370/254 |
| 2015/0256466 | A1* | 9/2015 | Roitshtein | H04L 47/22 709/234 |
| 2016/0014028 | A1* | 1/2016 | He | H04L 45/745 370/392 |
| 2016/0021014 | A1* | 1/2016 | Wetterwald | H04L 47/2441 370/235 |
| 2016/0142321 | A1* | 5/2016 | Gage | H04W 76/10 370/235 |
| 2016/0205072 | A1* | 7/2016 | Dusi | H04L 63/0254 726/13 |
| 2016/0308770 | A1* | 10/2016 | Zhang | H04L 43/028 |
| 2017/0019329 | A1* | 1/2017 | Kozat | H04L 45/50 |
| 2017/0063682 | A1* | 3/2017 | Lentczner | H04L 45/74 |
| 2017/0324632 | A1* | 11/2017 | Arora | H04L 63/1441 |
| 2018/0220283 | A1* | 8/2018 | Condeixa | H04W 28/0215 |
| 2019/0238469 | A1 | 8/2019 | Mizrahi et al. | |

FOREIGN PATENT DOCUMENTS

| | | | | | |
|---|---|---|---|---|---|
| WO | WO-2011049850 | A1 * | 4/2011 | | H04L 47/32 |
| WO | 2011070479 | A1 | 6/2011 | | |
| WO | WO-2016177316 | A1 * | 11/2016 | | H04L 12/46 |
| WO | WO-2017151022 | A1 * | 9/2017 | | H04L 1/0081 |

OTHER PUBLICATIONS

High-speed packet classification for differentiated services in next-generation networks Pi-Chung Wang;Chia-Tai Chan;Shuo-Cheng Hu;Chun-Liang Lee;Wei-Chun Tseng IEEE Transactions on Multimedia Year: 2004 | vol. 6, Issue: 6 | Journal Article | Publisher: IEEE (Year: 2004).*
Poster : Minimizing range rules for packet filtering using a double mask representation Ahmad Abboud;Abdelkader Lahmadi;Michael Rusinowitch;Miguel Couceiro;Adel Bouhoula 2019 IFIP Networking Conference (IFIP Networking) Year: 2019 | Conference Paper | Publisher: IEEE (Year: 2019).*
The impact of using Source Address Validation filtering on processing resources Ovidiu Strugaru;Alin D. Potorac; Adrian Graur 2014 10th International Conference on Communications (COMM) Year: 2014 | Conference Paper | Publisher: IEEE (Year: 2014).*
A CGA based IP source address authentication method in IPv6 access network Guang Yao; Jun Bi 2008 33rd IEEE Conference on Local Computer Networks (LCN)Year: 2008 | Conference Paper | Publisher: IEEE (Year: 2008).*
Wikipedia, "Link aggregation", pp. 1-12, May 18, 2020 https://en.wikipedia_org/w/index.php?title=Link_aggregation&oldid=957430013.
EP Application # 21188580.1 Search Report dated Jan. 4, 2022.
EP Application # 21188580.1 Office Action dated Dec. 22, 2023.
CN Application # 202110849743.6 Office Action dated Feb. 2, 2024.

* cited by examiner

STATEFUL FILTERING SYSTEMS AND METHODS

FIELD OF THE INVENTION

The present invention, in certain embodiments thereof, relates to methods and systems for filtering packets.

BACKGROUND OF THE INVENTION

A number of networking systems which process packets and/or frames with high performance are known.

SUMMARY OF THE INVENTION

The present invention, in certain embodiments thereof, seeks to provide improved methods and systems for filtering packets. In exemplary embodiments, such methods and systems are "stateful"; that is, the methods and systems perform filtering of packets and/or frames based, at least in part, on previously processed packets and/or frames.

Persons skilled in the art of networking devices will appreciate that, in general, there may be a need to choose between "simple" and higher-performance networking devices, as opposed to "smarter" but lower performance networking devices. One of the characteristics which may be useful in such devices is the ability to keep state-related information on flows traversing through devices; such state-related information will allow taking decisions in the devices based on the history of those flows. In exemplary embodiments of the present invention a mechanism is provided for high performance devices allowing the addition of state-related ("stateful") capabilities to the devices.

The term "filter", in its various grammatical forms, is used herein to refer to a situation in which a device, system or method makes a decision on whether or not packets traversing the device or system, or processed by the method, should be dropped. For simplicity of depiction and description, any system or device may be termed herein a "device". The present invention, in exemplary embodiments thereof, is described with reference to filtering.

It is, however, appreciated by the inventors of the present invention that exemplary embodiments of the present invention are not limited to filtering. "Learning" about data flows, as described herein, may itself be useful (in certain exemplary embodiments) even if no filtering takes place. For example, and without limiting the generality of the foregoing, it may be useful to obtain information on how many data flows traverse a device. Further without limiting the generality of the foregoing, it may be useful to know: which flows traverse a device; and which flows do not traverse a device. Such information, whether obtained exactly or approximately (as described below) may be useful.

In exemplary embodiments, in the case of filtering, a networking device is provided which is able to make a stateful decisions on whether or not packets traversing the device should be dropped. Specifically, by way of non-limiting example, a first packet coming from a particular flow would traverse the device as normal.

In one particular non-limiting example, a particular flow might be quite important, and might therefore have has two different paths (such as, by way of further non-limiting example, one satellite path and one land-line path associated with the flow). This would be because of the importance of the flow; in case a packet sent via one path does not arrive, then a packet sent via the other path would be expected to arrive. It would be helpful, as provided in exemplary embodiments of the present invention, that if such a packet arrived via a first path, a subsequent such packet arriving via a second path would be discarded. In certain exemplary embodiments, an entire flow arriving via a second path would be discarded once a packet of that flow arrived via a first path; this approach can work successfully if an ageing technique is used to cease discarding packets, and that ageing takes place sufficiently quickly (such as, by way of particular non-limiting example, which example might be variable in various particular embodiments, a few 10s of milliseconds) so that further desired packets are not discarded.

In one particular exemplary embodiment (and as further described below with reference to the drawings), a security mechanism (such as a security mechanism which may be known in existing networking device) may be useful in implementing the flow processing described above. By way of non-limiting example, a source address of an incoming frame or packet may be replaced by a flow identifier. The flow identifier may then be looked up using the security mechanism. If the flow identifier is not found in the security lookup, this is taken as an indication that a packet for this flow has not yet been seen, and the packet is processed normally. On the other hand, if the flow identifier is found in the security lookup, this is taken as an indication that a packet for this flow has already been seen, and the packet is dropped. As further described below, the inventors of the present invention believe that the described use of security lookup is the "opposite" of what is known in the art before the present invention, and thus is very different from what is known in the art before the present invention.

There is thus provided in accordance with an exemplary embodiment of the present invention a method for filtering packets, the method including receiving a plurality of packets, each packet of the plurality of packets including a source address, and for each one packet of the plurality of packets, processing the one packet by performing the following: modifying the source address of the one packet to include at least an identifier of a flow to which the one packet belongs.

Further in accordance with an exemplary embodiment of the present invention the processing the one packet also includes performing the following determining, based at least in part on the identifier of the flow to which the one packet belongs, whether another packet of the flow to which the one packet belongs has previously been processed, performing an operation on the one packet based on another packet of the flow to which the one packet belongs having previously been processed, and passing the one packet on for further processing based on another packet of the flow to which the packet belongs not having previously been processed.

Still further in accordance with an exemplary embodiment of the present invention the performing an operation on the one packet includes dropping the one packet.

Additionally in accordance with an exemplary embodiment of the present invention the performing an operation on the one packet includes counting the one packet.

Moreover in accordance with an exemplary embodiment of the present invention at least the processing the one packet is performed by a network element.

Further in accordance with an exemplary embodiment of the present invention the network element includes at least one of a bridge, a router, and a switch.

Still further in accordance with an exemplary embodiment of the present invention the network element includes a bridge, and at least the processing the one packet is performed by a modified bridge pipeline.

Additionally in accordance with an exemplary embodiment of the present invention the passing the one packet on for further processing includes passing the one packet on to a router for routing.

Moreover in accordance with an exemplary embodiment of the present invention the identifier of a flow to which the one packet belongs is based, at least in part, on a sequence number of the one packet.

Further in accordance with an exemplary embodiment of the present invention the passing the one packet on also includes learning the flow to which the one packet belongs as a flow which has previously been processed by recording the flow.

Still further in accordance with an exemplary embodiment of the present invention the determining includes determining, based at least in part, on whether the flow to which the one packet belongs is a flow which has been learned as a flow which has been previously processed.

Additionally in accordance with an exemplary embodiment of the present invention the method also includes removing the recording of the at least one flow as a flow which has previously been processed.

Moreover in accordance with an exemplary embodiment of the present invention the removing takes place after a time period has passed since the one flow has been recorded as a flow which has previously been processed.

There is also provided in accordance with another exemplary embodiment of the present invention a network element for filtering packets, the network element including reception circuitry configured to receive a plurality of packets, each packet of the plurality of packets including a source address, and packet processing circuitry configured, for each one packet of the plurality of packets, to process the one packet by performing the following: modifying the source address of the one packet to include at least an identifier of a flow to which the one packet belongs.

Further in accordance with an exemplary embodiment of the present invention the packet processing circuitry is also configured to process the one packet by performing the following: determining, based at least in part on the identifier of the flow to which the one packet belongs, whether another packet of the flow to which the one packet belongs has previously been processed, performing an operation on the one packet based on another packet of the flow to which the one packet belongs having previously been processed, and passing the one packet on for further processing based on another packet of the flow to which the packet belongs not having previously been processed.

Still further in accordance with an exemplary embodiment of the present invention the performing an operation on the one packet includes dropping the one packet.

Additionally in accordance with an exemplary embodiment of the present invention the performing an operation on the one packet includes counting the one packet.

Moreover in accordance with an exemplary embodiment of the present invention the network element includes at least one of a bridge, a router, and a switch.

Further in accordance with an exemplary embodiment of the present invention the network element includes a bridge, and at least the processing the one packet is performed by a modified bridge pipeline.

Still further in accordance with an exemplary embodiment of the present invention the identifier of the flow to which the one packet belongs is based, at least in part, on a sequence number of the one packet.

Additionally in accordance with an exemplary embodiment of the present invention the passing the one packet on also includes learning the flow to which the one packet belongs as a flow which has previously been processed by recording the flow.

Moreover in accordance with an exemplary embodiment of the present invention the determining includes determining, based at least in part, on whether the flow to which the one packet belongs is a flow which has been learned as a flow which has been previously processed.

Further in accordance with an exemplary embodiment of the present invention the passing the one packet on also includes removing the recording of the at least one flow as a flow which has previously been processed.

Still further in accordance with an exemplary embodiment of the present invention the removing takes place after a time period has passed since the one flow has been recorded as a flow which has previously been processed.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1A:
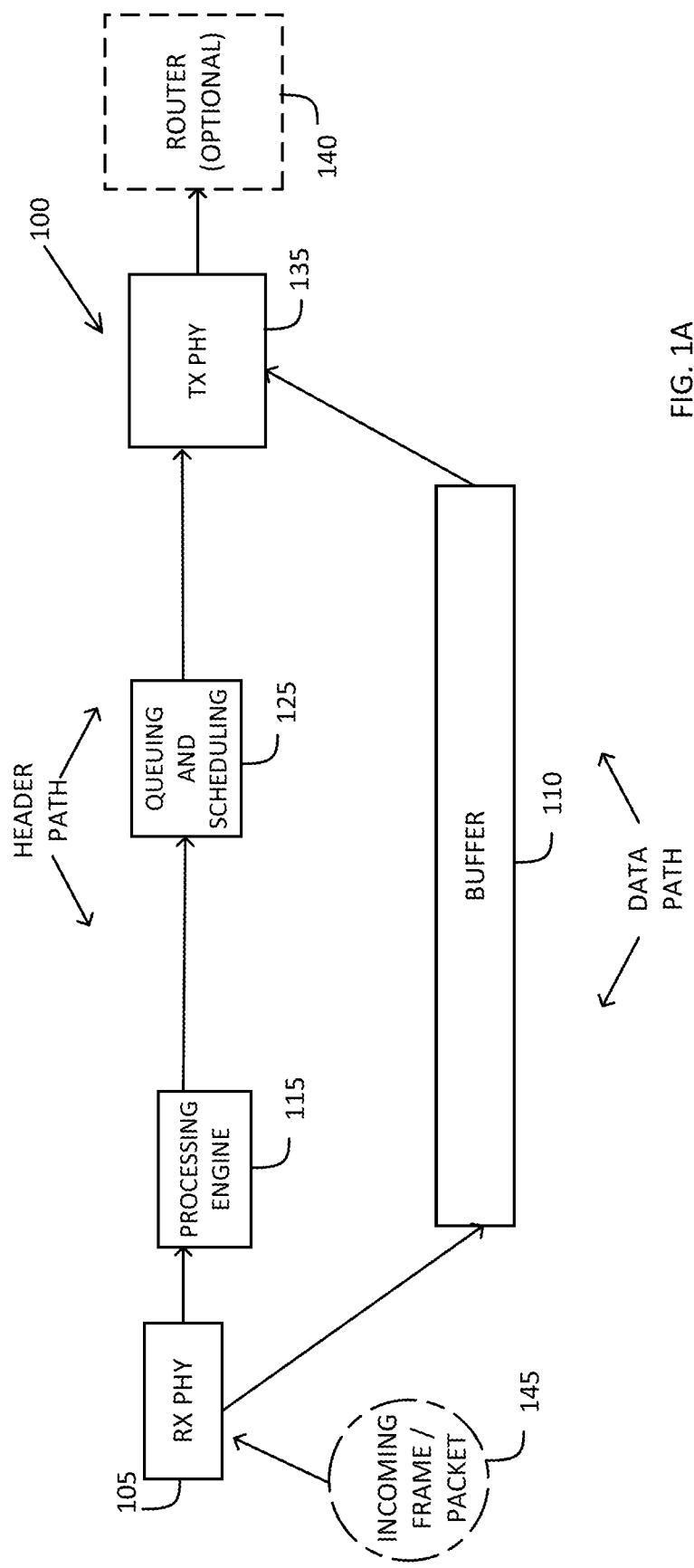
FIG. 1A is a simplified block diagram illustration of a system for processing packets, constructed and operative in accordance with an exemplary embodiment of the present invention.
Figure 1B:
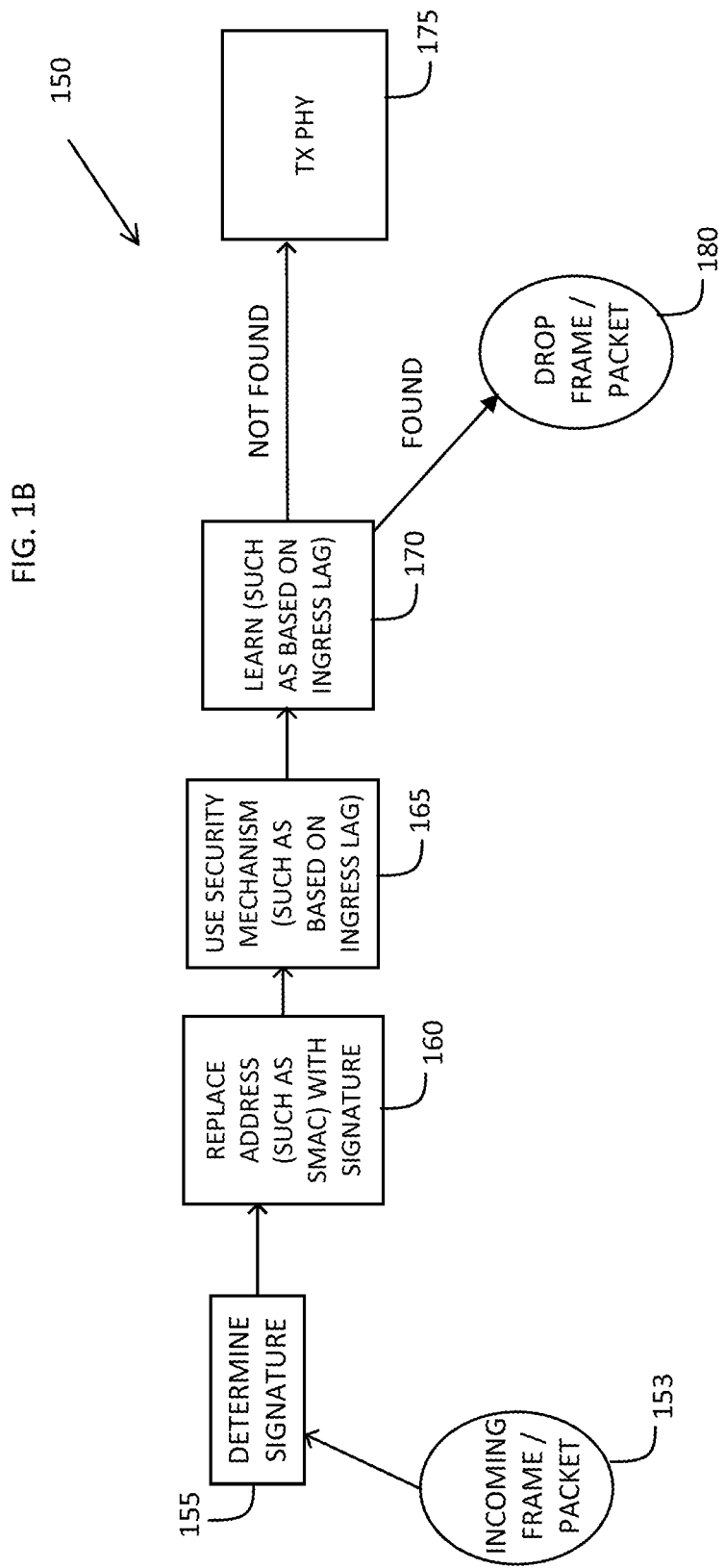
FIG. 1B is a simplified block diagram illustration of a portion of the system of FIG. 1, in accordance with an exemplary embodiment of the present invention.

Reference is now made to FIG. 1A, which is a simplified block diagram illustration of a system for processing packets, constructed and operative in accordance with an exemplary embodiment of the present invention; and to FIG. 1B, which is a simplified block diagram illustration of a portion of the system of FIG. 1A, in accordance with an exemplary embodiment of the present invention.

The system of FIG. 1A, generally designated 100, is a system for processing packets or frames; the system may be comprised, by way of non-limiting example, in a switch. The system of FIG. 1A, generally designated 100, may be comprised in an appropriate switch, router, or Network Interface Controller (NIC). In general, a switch, router, or NIC may be termed herein a "network element". By way of non-limiting example, systems commercially available from Mellanox Technologies Ltd. which might be appropriate network elements, include: Spectrum systems, such as the SN2700 system; and ConnectX-5 systems. Depending on the particular terminology used, persons skilled in the art might view the system 100 (excluding the optional router 140, discussed below) as a network bridge.

Various components of the system of FIG. 1A may be implemented, for example, in an application-specific integrated circuit (ASIC); such an implementation might be desirable in order to ensure adequate system performance. In various exemplary embodiments, bandwidth and packet load requirements of the system of FIG. 1A could be very high (such as, by way of non-limiting example, terabits of data and billions of packets per second). The inventors of the present invention believe that an ASIC implementation would be suitable for handling such loads; normally (by way of non-limiting example) a software implementation would not be so capable. Similarly (with reference to the discussion below of ageing), system reaction times on the order of 10 microseconds, over perhaps 10s of thousands of flows, might be handled; this would be another consideration in favor of an ASIC implementation. Further such considerations (also with reference to discussions below) include: large volumes of signature computations; handling of tables, which may usefully take place in one or more static random-access memories (SRAMs) in an ASIC; high performance buffering; and, in certain exemplary embodiments, providing more than two or four input/output ports (two or four being, in the opinion of the inventors of the present invention, a number more typical of known systems, before the present invention).

The system of FIG. 1A comprises physical receiving hardware (RX PHY) 105, which receives input (such as, by way of non-limiting example, an incoming frame/packet 145). A data portion of the received input (such as a data portion of the incoming frame/packet 145) is passed on to a data path, which comprises a buffer 110.

Generally in parallel, a header portion of the received input (such as a header portion of the incoming frame/packet 145) is passed on to a header path.

The header path comprises a processing engine 115; and a queueing and scheduling unit 125. The processing engine 115 and the queueing and scheduling unit 125 are together configured to place packets/frames into queues, and schedule the packets/frames for transmission, as is known in the art of bridges and switches.

Once both the data portion and the header portion of a packet have been processed, the header portion and the data portion are sent to physical sending hardware (TX PHY) 135, which performs physical transmission of the packet/frame.

An exemplary mode of operation of the system of FIG. 1A is now briefly described, with particular reference to FIG. 1B. FIG. 1B illustrates a non-limiting exemplary embodiment of the processing engine 115 of FIG. 1A. The system of FIG. 1B is generally designated 150. The system of FIG. 1B may also be termed a "pipeline" herein.

An incoming frame/packet 153 (corresponding to the incoming frame/packet 145 of FIG. 1A) is received; further blocks of the system of FIG. 1B refer to processing of a portion (whatever portion may be appropriate or needed in a given implementation of the exemplary embodiment of FIG. 1B) of the incoming frame/packet 153.

In signature determination block 155, a signature of the incoming packet is determined; the signature is used as a flow identifier. Some non-limiting examples of signature include:
1. a hash of the following fields of the incoming packet: SIP (source IP); DIP (destination IP); protocol type; SPORT (source port) and DPORT (destination port). Such a hash, as is well known in the art (such as, by way of non-limiting example, CRC16) can be used to map a larger (more bits) value into a smaller (fewer bits) value; in this case, the smaller value may comprise a value the size of a MAC address. It is appreciated that, in general, MAC addresses are 48 bits in length; in certain exemplary embodiments, a VLANID (typically 12 bits) or a BridgeID (typically 16 bits) may be concatenated to the MAC address, yielding a larger field. Alternatively, any appropriate hash, including a proprietary hash, may be used.
2. SIP alone (which in IPv4 is a 32-bit field).
3. SIP concatenated with SPORT.
4. a hash of the entirety of a packet.
5. a hash of SIP; DIP; protocol type; SPORT; DPORT; and sequence-number (such, by way of non-limiting example, TCP sequence number). The option of including sequence-number may be helpful in order to avoid overhead that might be incurred in hashing an entire packet; both a hash of the entirety of a packet and sequence-number may be helpful, in certain exemplary embodiments, to allow filtering of a single packet in a flow.

The signature determined by the signature determination block 155 is used by address replacement block 160 to replace an address in the header such as, for example, a source MAC (SMAC) address. In general, SMAC address are (in certain cases) not needed for packet/frame processing, such that SMAC addresses can be overwritten without causing an operational problem. In particular, persons skilled in the art will appreciate that, when the optional router 140 is present in the exemplary embodiment of FIG. 1A, functions which would otherwise use SMAC address do not need to be carried out, since alternative functions can be carried out by the router 140.

It is appreciated that the signature determination block 155 itself, and operations performed thereby, may comprise exemplary embodiments of the present invention, even without other components of the system of FIGS. 1A and 1B.

In block 165 a security mechanism (such as a conventional bridge security mechanism, but operating on the signature, as replaced in the address replacement block 160) is used for lookup to determine whether or not the signature is found in a security list (not shown) of the system 150; and in block 170 a learn mechanism takes place, in which the signature (if not found in block 165) is "learned" and added to the security list.

It is appreciated that, in the art before the present invention, security mechanisms were used to allow packets found in security lookup to be transmitted, and to forbid packets not found in security lookup to be transmitted. In exemplary embodiments of the present invention, a security mechanism is applied which is, in effect "the opposite" of what is known in the art before the present invention. If a signature of the incoming frame/packet 153 (as replaced in block 160) is found in the security mechanism lookup of block 165, this is taken as an indication that a flow to which the incoming frame/packet 153 belongs (or, in exemplary embodiments, a copy of the incoming frame/packet 153) has previously traversed the system 150; in such a case, the incoming frame/packet 153 is dropped (block 180). By contrast, if the signature of the incoming frame/packet 153 (as replaced in block 160) is not found in the security mechanism lookup of block 165, this is taken as an indication that a flow to which the incoming frame/packet 153 (or, in exemplary embodiments, a copy of the incoming frame/packet 153) has not previously traversed the system 150; in such a case, the incoming frame/packet is passed on (possibly through additional convention blocks, not shown) for transmission to physical transmission block 175 (shown for sake of convenience, and not necessarily actually comprised in the system 150).

Regarding the above discussion of ASIC implementation, specifically regarding block 170, in exemplary embodiments block 170 may be implemented in ASIC, in a conventional processor programmed with software, or in any suitable combination thereof without (in the opinion of the inventors of the present invention) impairing the performance of the system of FIGS. 1A and 1B.

It is appreciated that, in order to avoid a situation in which a given flow is permanently "blocked" by having all associated frames/packets dropped, an ageing mechanism should be supplied to the security mechanism, so that after a certain time security entries should be erased.

In general, in the pipeline depicted in FIG. 1B, the following elements are (in exemplary embodiments) different from elements, or in addition to elements, that are found in pipelines which are believed (by the inventors of the present invention) to have existed before the present invention: block 155; block 160; and block 165. The pipeline depicted in FIG. 1B may thus be termed a "modified pipeline" or a "modified bridge pipeline".

Figure 2:
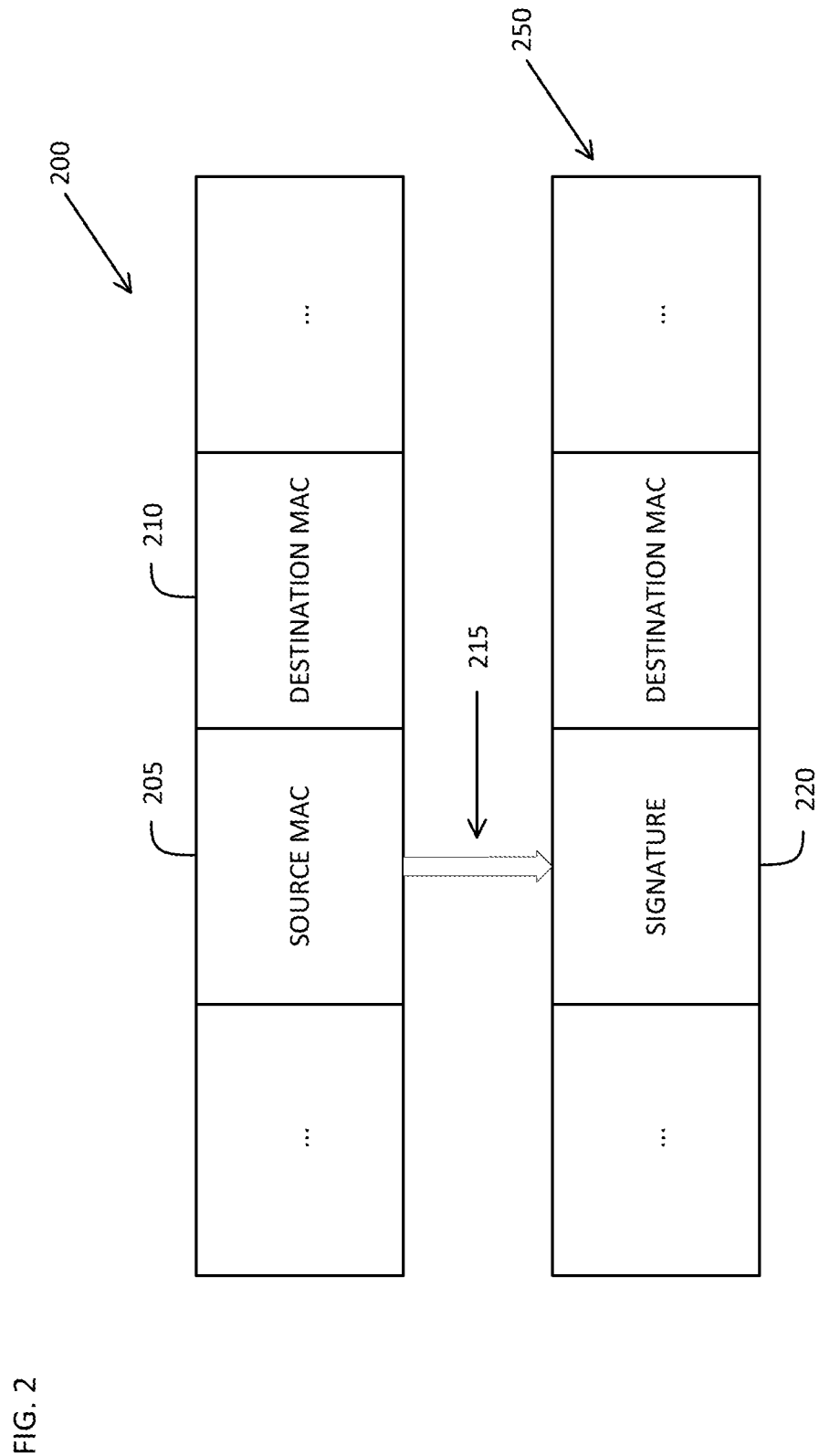
FIG. 2 is a simplified exemplary block diagram illustration of packet processing in the system of FIGS. 1A and 1B.

Reference is now additionally made to FIG. 2, which is a simplified exemplary block diagram illustration of packet processing in the system of FIGS. 1A and 1B, useful for understanding the operation of the system of FIGS. 1A and 1B.

FIG. 2 depicts a packet/frame 200 as typically received; such a packet includes a source MAC (SMAC) address 205 and a destination MAC (DMAC) address 210. An operation 215, such as that described above with reference to address replacement block 160, replaces the SMAC address 205 with a signature 220, thus yielding a modified packet 250.

The signature as referred to above is, in general, a result of a mathematical operation done on a portion of the packet. One particular non-limiting example of such an operation is an implementation of the well-known CRC16 function; persons skilled in the art will appreciate that other appropriate functions may be used.

The device of FIGS. 1A and 1B may be configured with a link-aggregation (LAG), which (in exemplary embodiments) includes all ports from which the type of packet may arrive to the system (100, 150) of FIGS. 1A and 1B, but via which this type of packet is not expected to leave said device. Ports from which a packet arrives are generally termed "ingress ports", while ports via which a packet leaves are generally termed "egress ports". Generally speaking, a definition of which are expected to be ingress ports and which are expected to be egress ports for packets of a given type is supplied by a management system. In general, systems in the field of network bridges are capable of applying various security policies. By way of non-limiting example, such a policy (based on SMAC or on another source indication) is generally port based. Thus, an incoming packet on a first port will not be understood to be subject to the same security policy as an incoming packet on a second port. Such a situation is overcome using LAG, which allows a plurality of ports to be treated, for such purposes, as if they are a single port (a single LAG).

In the present description, the type of LAG referred to is a receive (RX LAG).

Summarizing the above discussion, the device of FIGS. 1A and 1B is configured, in exemplary embodiments, to perform an L2 security lookup (which is itself a well-known operation); in the device of FIGS. 1A and 1B, when the security lookup takes place the security lookup takes place on the signature 220 (FIG. 2), which is different from such known operations. If the signature 220 is not found in the L2 security lookup, then no special processing takes place, and the frame/packet in question proceeds to be transmitted (TX PHY 175 of FIG. 1B). If however the signature 220 is found in the L2 security lookup, then the frame/packet in question is dropped (block 180 in FIG. 1B); and thus, only the first frame/packet of a given flow is transmitted, other frames/packets being dropped.

After a given amount of time "ageing" occurs, and old entries in the L2 security lookup table are removed. The amount of time may depend, by way of non-limiting example, on the size of the L2 security table and on the rate of packet arrival. Typical examples of such a given amount of time (which would be dependent on a particular implementation of the system of FIGS. 1A and 1B) could range from 10s of microseconds, to a few milliseconds, or even more. Typically, the given amount of time will vary depending on specific characteristics of an actual system, such as network speed, frequency of packet arrival, etc.; in practice, a network administrator might decide on the given amount of time in order to achieve desired system performance. Note that such given amounts of time mentioned are significantly shorter, in the opinion of the inventors of the present invention, than what is known in the art. Such very quick ageing may be implemented, by way of non-limiting example, by:

1. Associating a timer with each L2 security table entry, and clearing (or simply invalidating) the entry when the timer expires.

2. Having a clock-tick for the entire L2 security table; when the clock ticks, a counter (initially set, for example, to zero) is increased (for example, by one) for each entry; when the counter for a given entry exceeds a threshold value, the given entry is cleared or invalidated.

It is appreciated that, in general, referencing the above description of the system of FIG. 1B, it may be important for a security lookup (block 165) for a given packet to occur after a learning lookup (block 170) for a previous packet has been completed. Well known mechanisms (such as, for example, sending an ACK when learning lookup for a previous packet completes, and only then allowing security lookup for a given packet to complete) may be used to accomplish this end.

Figure 3:
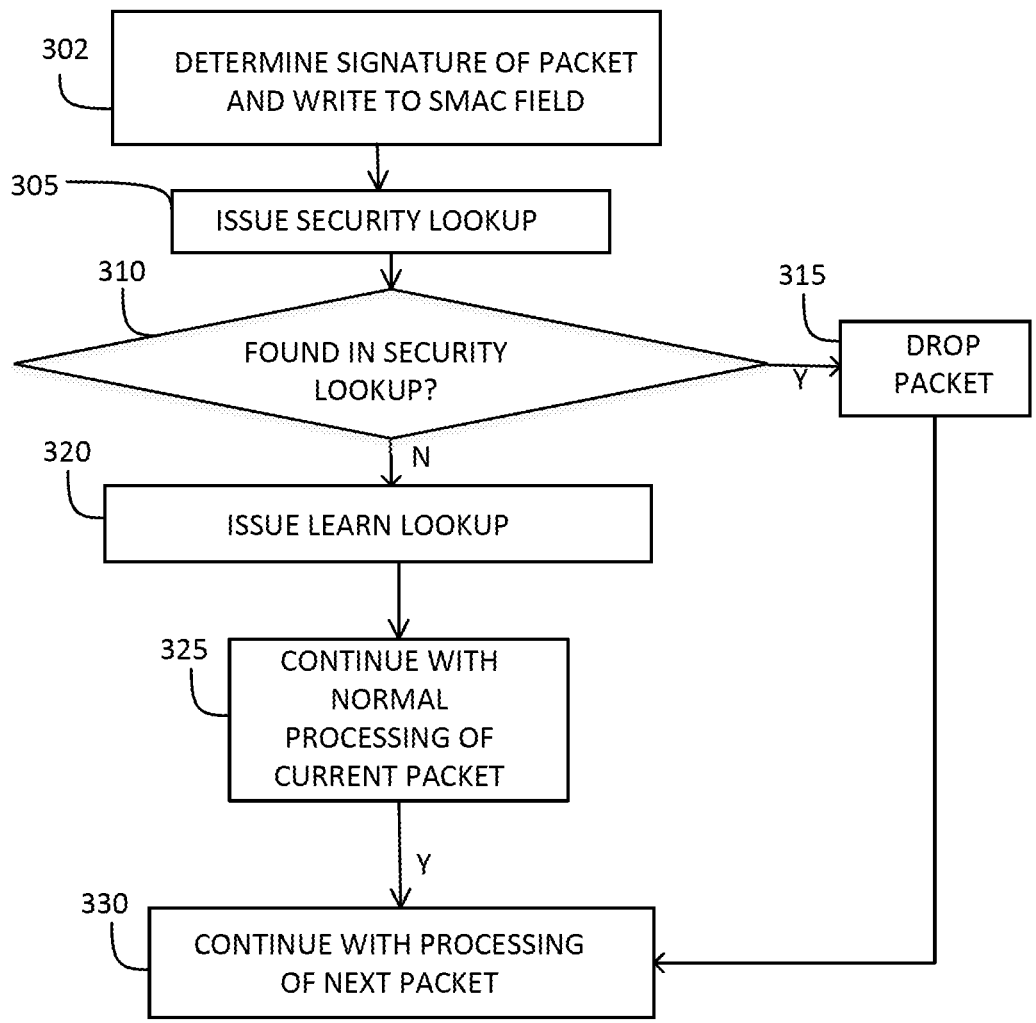
FIG. 3 is a simplified flowchart illustration of an exemplary method of operation of the system of FIGS. 1A and 1B.

Reference is now made to FIG. 3, which is a simplified flowchart illustration of an exemplary method of operation of the system of FIGS. 1A and 1B. The description of FIG. 3 will best be understood with reference to the above description of FIGS. 1A, 1B, and 2.

A signature of a received packet is determined (such as, for example, by signature determination block 155 of FIG. 1B, as described above) and written to the SMAC field of the packet (step 302).

A security lookup based on the signature is issued (step 305). If the signature is found in the security lookup (step 310), the packet is dropped (step 315), and processing continues for the next packet (step 330). Conversely, if the signature is not found in the security lookup, packet processing continues for the present packet. As explained above, such security handling is the "opposite" of what the inventors of the present invention believe is known in the art.

In step 320, a learn lookup is issued, so that the signature of the present packet will be added to a security table used in the security lookup of step 305. While the flowchart illustration of FIG. 3 depicts step 320 as occurring after step 310, it is appreciated that (as described above) it may be advantageous for step 320 to occur before step 305.

Normal packet processing continues (step 325), and then the next packet is processed (step 330).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for filtering packets, the method comprising:
   receiving a plurality of packets, by a network element, each packet of the plurality of packets comprising a source address field; and
   for each one packet of the plurality of received packets, processing the one packet in the network element receiving the one packet, by performing the following:
      modifying the source address field of the one packet to comprise at least an identifier of a flow to which the one packet belongs, the identifier comprising a flow-based signature of the one packet;
      determining, based at least in part on the identifier of the flow to which the one packet belongs, in the source address field of the one packet, whether another packet of the flow to which the one packet belongs has previously been processed;
      performing an operation on the one packet, the operation including dropping the one packet, based on another packet of the flow to which the one packet belongs having previously been processed; and
      passing the one packet on for further processing based on another packet of the flow to which the packet belongs not having previously been processed.

2. The method according to claim 1 and wherein the performing an operation on the one packet comprises counting the one packet.

3. The method according to claim 1 and wherein at least the processing the one packet is performed by a network element.

4. The method according to claim 3 and wherein the network element comprises at least one of: a bridge; a router; and a switch.

5. The method according to claim 3, and wherein:
   the network element comprises a bridge; and
   at least the processing the one packet is performed by a modified bridge pipeline.

6. The method according to claim 1 and wherein the passing the one packet on for further processing comprises passing the one packet on to a router for routing.

7. The method according to claim 1 and wherein the identifier of a flow to which the one packet belongs is based, at least in part, on a sequence number of the one packet.

8. The method according to claim 1 and wherein the passing the one packet on also comprises:
   learning the flow to which the one packet belongs as a flow which has previously been processed by recording the flow.

9. The method according to claim 8 and wherein the determining comprises determining, based at least in part, on whether the flow to which the one packet belongs is a flow which has been learned as a flow which has been previously processed.

10. The method according to claim 8 and also comprising removing the recording of said at least one flow as a flow which has previously been processed.

11. The method according to claim 10 and wherein the removing takes place after a time period has passed since the one flow has been recorded as a flow which has previously been processed.

12. A network element for filtering packets, the network element comprising:
   reception circuitry configured to receive a plurality of packets, each packet of the plurality of packets comprising a source address field; and
   packet processing circuitry configured, for each one packet of the plurality of packets, to process the one packet by performing the following:
      modifying the source address field of the one packet to comprise at least an identifier of a flow to which the one packet belongs, the identifier comprising a flow-based signature of the one packet;
      determining, based at least in part on the identifier of the flow to which the one packet belongs, in the source address field of the one packet, whether another packet of the flow to which the one packet belongs has previously been processed;
      performing an operation on the one packet, the operation including dropping the one packet, based on another packet of the flow to which the one packet belongs having previously been processed; and
      passing the one packet on for further processing based on another packet of the flow to which the packet belongs not having previously been processed.

13. The network element according to claim 12 and wherein the performing an operation on the one packet comprises counting the one packet.

14. The network element according to claim 12 and wherein the network element comprises at least one of: a bridge; a router; and a switch.

15. The network element according to claim 12, and wherein:
   the network element comprises a bridge; and
   at least the processing the one packet is performed by a modified bridge pipeline.

16. The network element according to claim 12 and wherein the identifier of the flow to which the one packet belongs is based, at least in part, on a sequence number of the one packet.

17. The network element according to claim 12 and wherein the passing the one packet on also comprises:
   learning the flow to which the one packet belongs as a flow which has previously been processed by recording the flow.

18. The network element according to claim 17 and wherein the determining comprises determining, based at least in part, on whether the flow to which the one packet belongs is a flow which has been learned as a flow which has been previously processed.

19. The network element according to claim 17 and wherein the passing the one packet on also comprises removing the recording of said at least one flow as a flow which has previously been processed.

20. The network element according to claim 19 and wherein the removing takes place after a time period has passed since the one flow has been recorded as a flow which has previously been processed.

21. The method according to claim 1 and wherein the flow-based signature comprises one of the following:
- a hash of the following fields of the one packet: source IP (SIP); destination IP (DIP); protocol type; source port (SPORT); and destination port (DPORT);
- SIP of the one packet;
- SIP of the one packet concatenated with SPORT of the one packet;
- a hash of the entirety of the packet; and
- a hash of the following fields: DIP of the one packet; protocol type of the one packet; SPORT of the one packet; DPORT of the one packet; and a sequence number of the one packet.

22. The network element according to claim 12 and wherein the flow-based signature comprises one of the following:
- a hash of the following fields of the one packet: source IP (SIP); destination IP (DIP); protocol type; source port (SPORT); and destination port (DPORT);
- SIP of the one packet;
- SIP of the one packet concatenated with SPORT of the one packet;
- a hash of the entirety of the packet; and
- a hash of the following fields: DIP of the one packet; protocol type of the one packet; SPORT of the one packet; DPORT of the one packet; and a sequence number of the one packet.

23. The network element according to claim 12, wherein the packet processing circuitry determines whether another packet of the flow to which the one packet belongs has previously been processed, by a security mechanism, which is configured to apply security policies based on the source address field of received packets and the ingress port through which the packet was received.

24. The network element according to claim 23, wherein the packet processing circuitry is configured with a link-aggregation which includes all ports from which the packet may arrive, for the packet filtering.

\* \* \* \* \*